Figure 1:
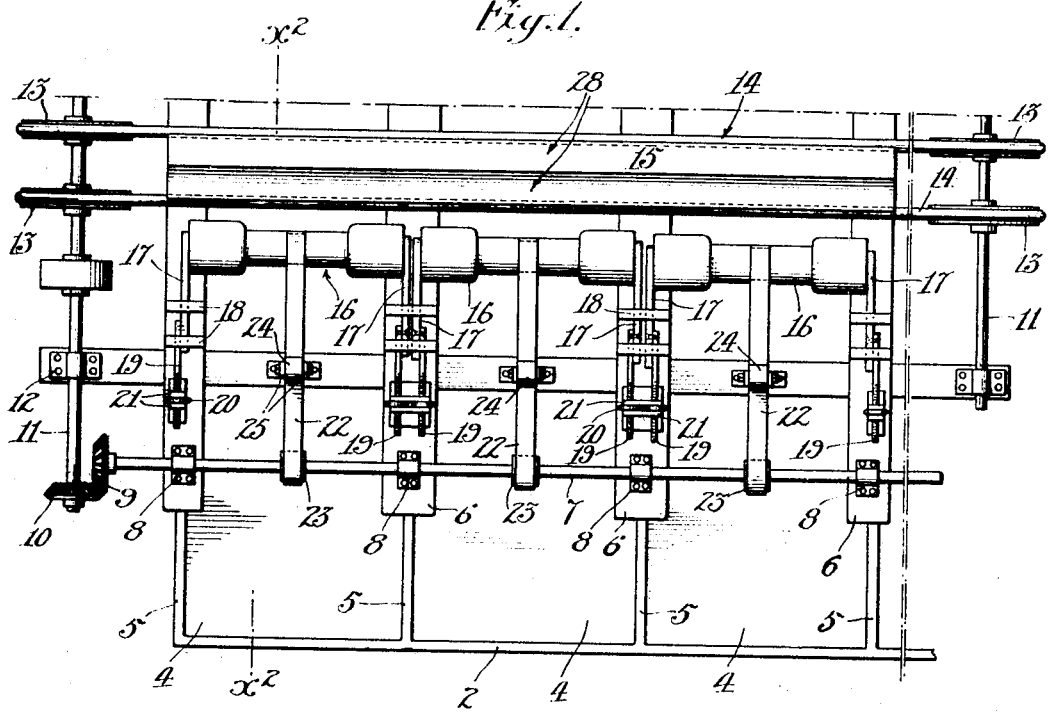

No. 888,130. PATENTED MAY 19, 1908.
J. H. URQUHART.
FRUIT SEPARATING OR ASSORTING MACHINE.
APPLICATION FILED JULY 29, 1907.

2 SHEETS—SHEET 1.

Witnesses:
Louis W. Gratz
Isabel Hall

Inventor
John H. Urquhart
by Townsend Lyon & Hackley
his attys

No. 888,130. PATENTED MAY 19, 1908.
J H. URQUHART.
FRUIT SEPARATING OR ASSORTING MACHINE.
APPLICATION FILED JULY 29, 1907.

2 SHEETS—SHEET 2.

Witnesses:—
Louis W. Gratz.
Isabel Hell.

Inventor.
John H. Urquhart.
by Townsend Lyon & Hackley
his atty.

UNITED STATES PATENT OFFICE.

JOHN H. URQUHART, OF RIVERSIDE, CALIFORNIA, ASSIGNOR TO FRED STEBLER AND AUSTIN A. GAMBLE, OF RIVERSIDE, CALIFORNIA.

FRUIT SEPARATING OR ASSORTING MACHINE.

No. 888,130.     Specification of Letters Patent.     Patented May 19, 1908.

Application filed July 29, 1907. Serial No. 386,138.

*To all whom it may concern:*

Be it known that I, JOHN H. URQUHART, a citizen of the United States, residing at Riverside, in the county of Riverside and State of California, have invented a new and useful Fruit Separating or Assorting Machine, of which the following is a specification.

This invention relates to machines for separating and assorting fruit according to its sizes and particularly to that class of machines wherein a grading rope traveling horizontally through the machine is utilized in connection with a roller or series of rolls disposed opposite such grading rope to form a series of different sized openings through which the fruit drops by gravity, the roller or rolls being rotated in a direction transverse to the direction of movement of the grading rope whereby as the fruit is carried along by the grading rope the fruit is rotated so as to find its smallest diameter.

With machines of this character, as heretofore used, inconvenience has been experienced from the fact that the fruit of a given size would drop at the commencement of the grading opening and where large receiving bins have been employed in connection with the grader the fruit has all been delivered at one side of such bin. Where wide bins and a long section of the machine for a given grade or size of fruit have been employed, the object of such wide bins has been to enable more than one fruit packer to work at such bin in packing the fruits from such bin, and it has been found essential that the fruits delivered to such bin should be delivered as evenly as possible to both sides of the bin to prevent the necessity of the packers pulling the body of fruit toward them and it is to provide for the delivery of the fruits evenly to both sides of the bin that the improvements herein set forth have been made. It is obvious that the foregoing objection and disadvantage has been equally present whether the machine be one having a series of rolls each independently adjustable to secure a graduated runway or series of graduated discharge openings, or a single graduated roller has been provided in connection with the grading rope, and this invention is equally applicable to either of these forms of fruit graders or sizers.

The invention consists in the provision of a grading apparatus mounted over a series of fruit receiving bins, and comprising a grading rope running longitudinally through the machine, of a rotary member rotating transversely of the direction of movement of the grading member, the rotating member provided at the center of each bin with a cutaway portion forming at the center of the bin a grading opening between the grading member and the rotary member, so that the fruit of the size to be delivered to a given bin will be delivered at the center of the bin.

Figure 2:
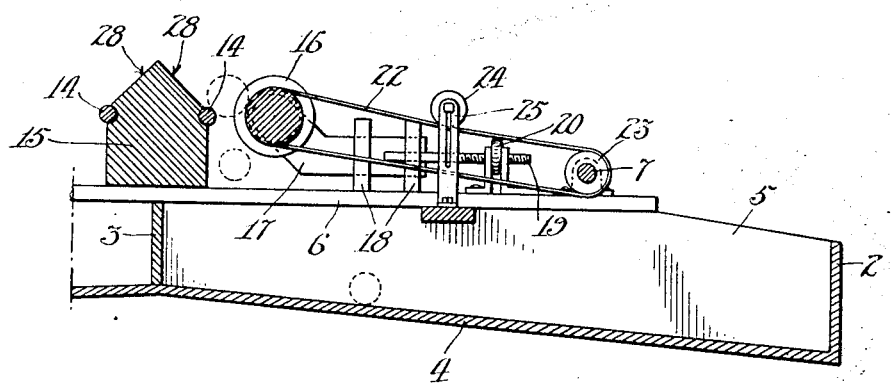
Figure 3:
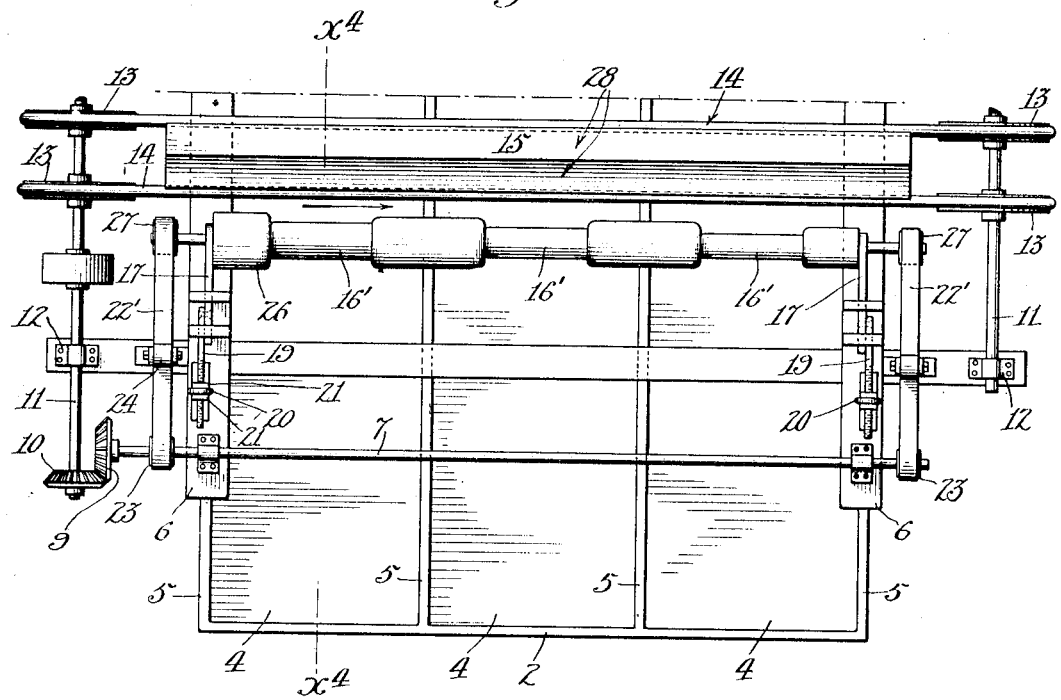
Figure 4:
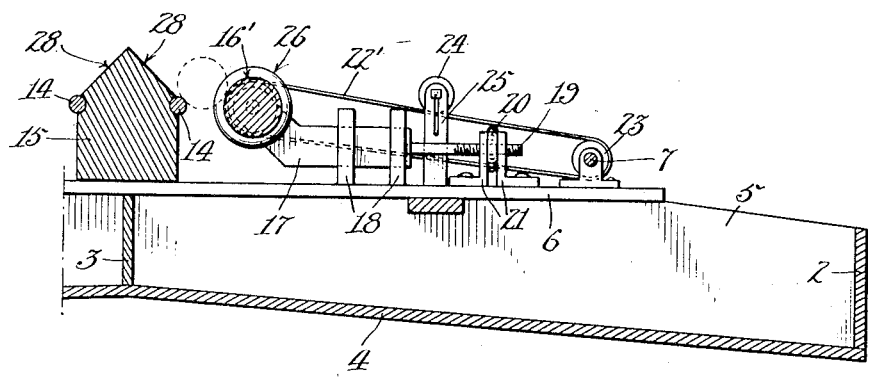

The invention consists further in the construction and interrelation of parts hereinafter described and more particularly pointed out in the claims and will be more readily understood by reference to the accompanying drawings in which;

Figure 1 is a plan view of a fruit sizer or grader embodying this invention. As shown in this figure the invention is applied to a grader, the transversely rotating member of which is composed of a series of rolls each independently adjustable and provided at its center with a cut-away portion of smaller diameter, such cut-away portion forming with the grading rope the grading discharge or opening through which the fruit drops into the center of the grading bin. Fig. 2 is a sectional view on the line $x^2$—$x^2$ of Fig. 1. Fig. 3 is a plan view of a grading or assorting machine in which the transversely rotating member is either made in one piece or so connected as to be substantially one piece and to be adjustable as one piece. This transversely rotating member is made up of graduations and between each graduation is a cut-away portion which comes directly over the center of the fruit bins and forms with the grading member the fruit discharge or opening. Fig. 4 is a sectional view taken on the line $x^4$—$x^4$ of Fig. 3.

As shown in the drawings, 2 represents the front wall and 3 the rear wall of a series of bins, and 4 the bottom or floor of such bins. Over this series of bins is arranged the grading or sizing machine, preferably formed in duplicate, so as to provide two fruit runways and a double series of bins, but in the drawings I have illustrated only one side of such double machine indicating the other side merely by the grading rope and the central divider or support 15 for the grading ropes.

5, 5 represent the partitions separating the several bins. On the top of each of these partitions 5 is a bed plate 6, in which the line shaft 7 has its bearings 8. This line shaft is connected at one end by a bevel pinion 9 with a bevel pinion 10 carried by a shaft 11 at the end of the machine. This shaft 11 has bearings 12 in a suitable support at one end of the machine. On the shaft 11 is a grooved pulley 13, and at the other end of the machine is a similar transverse shaft 11 having a similar grooved pulley 13. The grading rope 14 passes about from one pulley 13 over and about the other pulley 13, and the upper leg of the rope 14 travels in a groove provided in the divider 15.

As shown in Fig. 1, the transversely rotating member forming one side of the runway is made up of a series of rolls 16, each roll 16 being of a length substantially equal to the width of the fruit bin underneath it. Each of these rolls 16 is carried by arms 17 passing through guide 18 on the bed plate 6 and connected with adjusting screws 19 passing through eyes 21 in which are carried the adjusting screws 20 by means of which each of the rolls 16 may be adjusted toward or away from the grading rope independent of any movement of any of the other rolls 16, thus affording an individual adjustment for each size or grade of the machine. Each of the rolls 16 is provided with a cut-away portion at the center, such cut-away portion having a smaller diameter than the ends of the rolls, and the large ends of the rolls are preferably inclined or beveled as shown at the sides toward the cut-away portion. Preferably each roll is driven by a belt 22 which passes around the roll in a groove at the center of the cut-away portion, this belt passing over a driving pulley 23 on the line shaft 7 and under a belt tightener 24. This belt tightener is shown in the form of a pulley mounted in standards 25. It is obvious that this belt tightener may be modified and that the manner of driving the roll 16 changed to suit the manufacture of the machine without departing from the spirit of the invention.

In Figs. 3 and 4 the invention is shown as applied to a grading or assorting machine in which the transversely rotating member is made either in one piece or in several sections so attached together as to be adjustable only by adjusting the whole of the transversely rotating member. In this form of the invention the transversely operating member 26 is provided with a series of graduated portions, and between each of the graduated portions is a cut-away portion 16' corresponding to the cut-away portions 16 of Fig. 1, and for the same purpose the transversely operating member or roller is supported in arms 17 in like manner as shown in Fig. 1, but the roller 26 is driven by means of belts 22' operating over pulleys 23 on the line shaft 7 and passing over pulleys 27 on the shaft of the roller 26. Similar belt tighteners 24 are shown in connection with the belts 22'. The grading rope 14 is carried on grooved pulleys carried by transverse shafts 11 at opposite ends of the machine in a manner similar to that shown in Fig. 1, and the divider 15 is the same. In all the figures of the drawings I have illustrated the divider 15 as provided with two grooves and have illustrated two traveling members or grading ropes 14, and it will be understood that in the formation of a double machine the transversely rotating member made up of a single graduated roller 26 or a series of rollers 16 is provided in connection with both of the grading ropes 14. In other words that the apparatus is duplicated on each side of the longitudinal divider 15. The divider 15, as shown, is preferably provided with two sloping sides 28 so that in case the oranges or other fruits or vegetables should roll up the divider gravity will bring them back down onto the traveling rope 14 and rotary member opposite thereto. It is thus seen that by providing the transversely operating member with the cut-away portions 16 of reduced diameter, that the grading opening formed between such portions and the rope is brought to the center of the bin, and the fruit dropping through a given opening will be distributed equally throughout such bin, whereas if the grading opening between the traveling belt and the transversely rotating member were of the same size for the width of a bin all fruit dropping through such grading opening would drop at the commencement of such opening which would be at the front or approaching side of the bin, and it would be necessary in order to secure a distribution of the fruit to both sides of the bin to move the fruit.

It is obvious that the invention is applicable to either "single" or "double" machines and I therefore do not confine myself to its application to either of these forms. By "single" machines I refer to graders having only a single runway and by "double" machines I refer to graders provided with two runways. In the drawings I have illustrated one runway and the longitudinally traveling member of the second runway, but it will be understood that in single machines only one belt or traveling member is provided.

Having thus described my invention, what I claim as new and desire to secure by Letters Patent is:—

1. In a fruit separating or assorting apparatus, in combination with suitable bins, a grading-way, arranged over said bins, for the fruit to pass along and be separated or assorted, the same comprising a carrier member moving longitudinally of the machine, a rotary member arranged adjacent to such carrier member so as to form in conjunction therewith the grading-way, said rotary member formed of a series of graduated portions, each graduated portion provided intermediate of the bin thereunder with a cutaway portion of smaller diameter than its ends, such cutaway portions forming with the carrier member the discharge openings for the fruit, said rotary member rotating transversely to the movement of the carrier member.

2. In a fruit separating or assorting apparatus, in combination with suitable bins, a grading-way having one of its sides formed by a member traveling horizontally through the machine, and its other side formed by a rotary member arranged adjacent to such carrier member and rotating transversely to the direction of movement of said carrier member, said rotary member formed of a series of sections, each section provided intermediate of the bin thereunder with a portion of smaller diameter, such portion forming with said carrier member the discharge aperture through which the fruit of a given size is discharged.

3. In a fruit separating or assorting apparatus, in combination with suitable bins, a grading-way for the fruit, such grading-way formed by a carrying member moving longitudinally of the machine, a rotary member arranged adjacent to such carrying member and rotating transversely to the movement of said carrying member, means for supporting said carrying member in a horizontal position, said rotary member composed of a series of sections, each section provided intermediate its ends and intermediate of the bin thereunder with a cutaway portion of smaller diameter, a grading or discharge aperture being formed between the periphery of the cutaway portion and carrying member through which fruit of a given size is discharged, and means for adjusting said rotary member with respect to said carrying member.

4. In a fruit separating machine, the combination with a supporting frame and fruit bins, of a fruit runway formed by a relatively stationary member and a longitudinal series of rolls arranged end to end at different distances from said stationary member, each of said rolls provided between its ends, and intermediate of the bin thereunder, with a portion of smaller diameter than its ends, thus providing communicating spaces of progressively-varying sizes for the discharge of the fruit, such spaces being arranged above the bins, means for independently adjusting the rolls with relation to said stationary member, means for driving the rolls, and means for positively feeding the fruit along the runway.

5. In a fruit separating machine, the combination with a supporting frame and fruit bins formed in connection therewith, of a central longitudinal divider forming one side of each of two parallel runways, a series of rolls disposed on each side of the divider and arranged end to end at different distances from the divider forming therewith a runway, a carrier member moving longitudinally of the divider and adapted to carry the fruit along the runway, each of said rolls provided intermediate its ends, and intermediate of the bin thereunder, with a portion of smaller diameter than its front end forming progressively-varying discharge spaces for the fruit above said bins, means for adjusting the rolls of each series toward and from the common divider, means for driving the rolls, and means for moving said carrying member.

6. In a fruit separating machine, a runway for the fruit comprising coöperating parallel members, one of said members consisting of a series of rolls arranged end to end and disposed progressively at different distances from the other member, means for adjusting each roll independently with respect to the other parallel member, the other parallel member comprising a carrying member moving longitudinally of said series of rolls, fruit bins arranged underneath said runway, each of said rolls provided with a portion of smaller diameter than its forward end, such portions forming with the carrying member progressively larger fruit discharge apertures along the length of the runway, such apertures being arranged at the center of the fruit bins to discharge the fruit at the center of the bins.

7. In a fruit separating apparatus, a frame and a series of bins separated one from another by partitions, a rotary member supported on top of said frame, a horizontally moving carrier operated alongside said rotary member, said rotary member formed of a series of sections or portions forming in conjunction with said carrier a graduated runway, each of such sections provided at a portion intermediate its fruit bin with a portion of smaller diameter than the diameter of the section, such smaller diameter portions forming with the carrier discharge apertures above the bins, means for operating said carrier, and means for rotating said rotary member transversely to the direction of movement of the carrier.

In testimony whereof, I have hereunto set my hand at Riverside California this 11th day of July 1907.

JOHN H. URQUHART.

In presence of—
  K. D. HARGER,
  RAYMOND HEST.